(12) United States Patent
Sawauchi et al.

(10) Patent No.: US 7,968,625 B2
(45) Date of Patent: Jun. 28, 2011

(54) AQUEOUS FLUOROPOLYMER DISPERSION AND PROCESS FOR PRODUCING THE SAME

(75) Inventors: Chie Sawauchi, Settsu (JP); Nobuhiko Tsuda, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 691 days.

(21) Appl. No.: 11/916,753

(22) PCT Filed: Jun. 9, 2006

(86) PCT No.: PCT/JP2006/311639
§ 371 (c)(1),
(2), (4) Date: Dec. 6, 2007

(87) PCT Pub. No.: WO2006/132368
PCT Pub. Date: Dec. 14, 2006

(65) Prior Publication Data
US 2009/0105372 A1    Apr. 23, 2009

(30) Foreign Application Priority Data

Jun. 10, 2005 (JP) ................. 2005-171637
Jun. 15, 2005 (JP) ................. 2005-175426

(51) Int. Cl.
*C08F 6/10*    (2006.01)
(52) U.S. Cl. ......... 523/332; 524/544; 526/209; 526/214
(58) Field of Classification Search .......... 523/332; 524/544; 526/209, 214
See application file for complete search history.

(56) References Cited

U.S. PATENT DOCUMENTS

| | | | | |
|---|---|---|---|---|
| 4,369,266 A | * | 1/1983 | Kuhls et al. .................. | 523/332 |
| 6,395,848 B1 | * | 5/2002 | Morgan et al. ................ | 526/214 |
| 2003/0153674 A1 | | 8/2003 | Visca et al. | |
| 2004/0171736 A1 | | 9/2004 | Dadalas et al. | |
| 2004/0186219 A1 | * | 9/2004 | Dadalas et al. ............... | 524/544 |
| 2006/0281946 A1 | | 12/2006 | Morita et al. | |

FOREIGN PATENT DOCUMENTS

| | | |
|---|---|---|
| EP | 1 538 177 A1 | 6/2005 |
| EP | 1661916 A1 | 5/2006 |
| EP | 1 702 932 A1 | 9/2006 |
| EP | 1 714 986 A1 | 10/2006 |
| JP | 55-120630 | 9/1980 |
| JP | 10007863 A | 1/1998 |
| JP | 2003-500495 A | 1/2003 |
| JP | 2003-119204 | 4/2003 |
| JP | 2003-119204 A | 4/2003 |
| JP | 2003-286379 | 10/2003 |
| JP | 2003-286379 A | 10/2003 |
| JP | 2004-359870 | 12/2004 |
| JP | 2004-359870 A | 12/2004 |
| JP | 2005-501956 A | 1/2005 |
| JP | 2005-36002 | 2/2005 |
| JP | 2005-36002 A | 2/2005 |
| WO | 00/71590 A1 | 11/2000 |
| WO | 03020836 A1 | 3/2003 |
| WO | 2004/078836 A1 | 9/2004 |
| WO | 2005/003075 A1 | 1/2005 |
| WO | WO-2006/132368 A1 * | 12/2006 |

* cited by examiner

Primary Examiner — Peter D. Mulcahy
Assistant Examiner — Henry Hu
(74) Attorney, Agent, or Firm — Sughrue Mion, PLLC

(57) ABSTRACT

A process for producing an aqueous fluoropolymer dispersion which includes adding a specific compound to a to-be-treated aqueous fluoropolymer dispersion containing a particle of fluoropolymer dispersed therein, the to-be-treated aqueous fluoropolymer dispersion containing a fluorinated surfactant (A) with a molecular weight lower than 1000 in an amount of 100 ppm or less of the fluoropolymer and the specific compound being (1) a sulfosuccinic acid alkyl ester or a salt thereof, or a sulfosuccinic acid fluoroalkyl ester or a salt thereof, (2) the fluorinated surfactant (A), (3) a fluorinated surfactant (B) with a molecular weight lower than 1000, differing from the fluorinated surfactant (A) and/or (4) an aliphatic carboxylic acid or a salt thereof, which compound is added in total amount of 10 to 5000 ppm of said fluoropolymer.

7 Claims, No Drawings

AQUEOUS FLUOROPOLYMER DISPERSION AND PROCESS FOR PRODUCING THE SAME

TECHNICAL FIELD

The present invention relates to an aqueous fluoropolymer dispersion and a process for producing the same.

BACKGROUND ART

Aqueous fluoropolymer dispersions, when applied by such a method as coating or impregnation, can form films, coating films and the like excellent in such characteristics as chemical stability, nonstickiness and weather resistance. Therefore, they are widely used in such fields of application as lining of cooking utensils and pipes and manufacture of impregnated glass cloth membranes. Aqueous fluoropolymer dispersions are generally obtained by polymerization in the presence of a fluorinated surfactant. From the viewpoint of the characteristics of films and so forth, it is preferred that the content of the fluorinated surfactant be low.

As a method of reducing the fluorinated surfactant level, the method which comprises passing a fluoropolymer dispersion, with a nonionic, anionic or cationic surfactant added for the purpose of stabilization, through a semipermeable ultrafiltration membrane to thereby increase the concentration of the fluoropolymer has been proposed (cf. Patent Document 1).

In Patent Document 1, mention is made of sulfosuccinic acid esters or salts thereof and like anionic surfactants as stabilizing emulsifiers but there is no substantial description thereof; further, there is no substantial description about the use thereof with a nonionic surfactant.

It has been disclosed that even when an aqueous fluoropolymer dispersion contains a nonionic surfactant, the concentrate derived therefrom encounters the problems of increased viscosity and reduced stability if the content of a fluorinated surfactant with a molecular weight lower than 1000 is lower than 0.025% by weight of the solid matter and that the problems are alleviated by the dispersion containing an anionic non-fluorinated surfactant or fluorinated anionic surfactant (cf. Patent Document 2).

However, in Patent Document 2, there is no description of any sulfosuccinic acid ester as the anionic non-fluorinated surfactant usable for lightening the increase in viscosity; further, the anionic fluorinated surfactant is restricted to one with a molecular weight of not lower than 1000.

A method of concentrating aqueous fluoropolymer dispersions which comprises adding a nonionic non-fluorinated surfactant, a fluorinated anionic surfactant or a mixture of these in an amount of 10 to 5000 ppm relative to the fluoropolymer solid matter before or after the concentration procedure has also been proposed (cf. Patent Document 3). It has been pointed out, however, that this method has a problem in that low surfactant addition amounts rather cause increases in viscosity.

Patent Document 1: Japanese Kokai Publication Sho-55-120630
Patent Document 2: United States Patent Application Publication 2004/186219
Patent Document 3: United States Patent Application Publication 2004/171736 ([0016])

DISCLOSURE OF INVENTION

Problems which the Invention is to Solve

In view of the above-discussed state of the art, it is an object of the present invention to provide an aqueous fluoropolymer dispersion inhibited from increasing in viscosity even when the concentration of the fluorinated surfactant with a molecular weight lower than 1000 is low as well as a method of obtaining such aqueous fluoropolymer dispersion.

Means for Solving the Problems

The present invention is related to a process for producing an aqueous fluoropolymer dispersion which comprises adding a specific compound to a to-be-treated aqueous fluoropolymer dispersion containing a particle of fluoropolymer dispersed therein, said to-be-treated aqueous fluoropolymer dispersion containing a fluorinated surfactant (A) with a molecular weight lower than 1000 in an amount of 100 ppm or less of said fluoropolymer, and said specific compound being (1) a sulfosuccinic acid alkyl ester or a salt thereof, or a sulfosuccinic acid fluoroalkyl ester or a salt thereof, (2) said fluorinated surfactant (A), (3) a fluorinated surfactant (B) with a molecular weight lower than 1000 differing from said fluorinated surfactant (A) and/or (4) an aliphatic carboxylic acid or a salt thereof which compound is added in total amount of 10 to 5000 ppm of said fluoropolymer.

The present invention is related to an aqueous fluoropolymer dispersion wherein a particle of fluoropolymer is dispersed, said aqueous fluoropolymer dispersion containing a fluorinated anionic surfactant (Aa) of 7 to 10 carbon atoms in an amount of 100 ppm or less of the fluoropolymer, and further containing a sulfosuccinic acid alkyl ester or a salt thereof, a sulfosuccinic acid fluoroalkyl ester or a salt thereof and/or a fluorinated anionic surfactant (Ba) of 4 to 6 carbon atoms in total amount of 10 to 5000 ppm of the fluoropolymer.

The present invention is explained hereinafter in detail.

The process for producing an aqueous fluoropolymer dispersion according to the present invention comprises adding a specific compound to a to-be-treated aqueous fluoropolymer dispersion.

The to-be-treated aqueous fluoropolymer dispersion comprises a particle of fluoropolymer dispersed therein. The fluoropolymer, so referred to herein, is a polymer having a fluorine atom bound to a carbon atom. The fluoropolymer is not particularly restricted but includes polytetrafluoroethylene [PTFE], modified PTFE, tetrafluoroethylene [TFE]/hexafluoropropylene [HFP] copolymers [FEPs], TFE/perfluoro (alkyl vinyl ether) [PAVE] copolymers [PFAs], ethylene/TFE copolymers [ETFEs], polyvinylidene fluoride [PVDF] and polychlorotrifluoroethylene [PCTFE], among others. The modified PTFE, so referred to herein, is a non-melt-processable fluoropolymer obtained by polymerizing TFE and a very small proportion of a monomer. As the monomer to be used in a very small proportion, three may be mentioned, for example, fluoroolefins such as HFP and chlorotrifluoroethylene [CTFE], fluoro(alkyl vinyl ether) having an alkyl group of 1 to 5, in particular 1 to 3, carbon atoms; fluorodioxoles; perfluoroalkylethylenes; and ω-hydroperfluoroolefins. The fluoropolymer in the to-be-treated aqueous fluoropolymer dispersion is preferably a perfluoropolymer, in particular PTFE or a modified PTFE.

The particles of fluoropolymer generally have an average primary particle diameter of 50 to 500 nm, preferably 100 to 350 nm. The average primary particle diameter is determined in the following manner. A working curve is constructed which shows the relation between the transmittance of incident light rays having a wavelength of 550 nm per unit length of an aqueous dispersion adjusted to a fluoropolymer concentration of 0.22% by mass and the average primary particle diameter determined by particle diameter measurements in a certain specific direction on a transmission electron photomicrograph, and the average primary particle diameter of a sample is determined, using the working curve, from the transmittance as measured in the above manner.

The to-be-treated aqueous fluoropolymer dispersion generally comprises the above-mentioned particles of fluoropolymer dispersed in an aqueous medium. The aqueous medium is not particularly restricted but may be any water-containing liquid. Thus, it may contain, in addition to water, a non-fluorinated organic solvent and/or a fluorinated organic solvent such as an alcohol, ether, ketone or paraffin wax.

The to-be-treated aqueous fluoropolymer dispersion may further contain, in addition to the fluoropolymer and aqueous medium, a surfactant such as a fluorinated surfactant, nonionic surfactant, as described later herein. The to-be-treated aqueous fluoropolymer dispersion may contain a fluorinated surfactant in an amount of preferably 100 ppm or less, more preferably 50 ppm or less, still more preferably 30 ppm or less, of the fluoropolymer. The to-be-treated aqueous fluoropolymer dispersion may contain a nonionic surfactant in an amount of preferably 50 parts by mass or less, more preferably 20 parts by mass or less, per 100 parts by mass of the fluoropolymer. The fluorinated surfactant concentration, so referred to herein, is determined by adding an equal volume of methanol to the aqueous dispersion to be assayed, subjecting the mixture to Soxhlet extraction and subjecting the extract to high-performance liquid chromatography [HPLC]. The nonionic surfactant content (N) in the aqueous dispersion, so referred to herein, is determined by weighing about 1 g (X g) of the sample in an aluminum cup with a diameter of 5 cm, heating the sample at 100° C. for 1 hour to give a heating residue (Y g), further heating the heating residue (Y g) at 300° C. for 1 hour to give a heating residue (Z g) and making a calculation according to the equation: $N=[(Y-Z)/Z]\times 100(\%)$.

The to-be-treated aqueous fluoropolymer dispersion generally has a fluoropolymer concentration of 30 to 70% by mass. When the fluoropolymer concentration is lower than 30% by mass, the economic efficiency in transportation may sometimes be reduced and, at levels exceeding 70% by mass, the stability may sometimes be deteriorated. A preferred lower limit of the fluoropolymer concentration is 35% by mass and a preferred upper limit thereof is 65% by mass. The fluoropolymer concentration (P), so referred to herein, is determined by weighing about 1 g (X g) of the sample in an aluminum cup with a diameter of 5 cm, drying the sample at 100° C. for 1 hour and then further drying at 300° C. for 1 hour to give a heating residue (Z) and making a calculation as follows: $P=Z/X\times 100(\%)$.

The to-be-treated aqueous fluoropolymer dispersion contains a fluorinated surfactant (A) in an amount of 100 ppm or less of the fluoropolymer. The fluorinated surfactant (A) is a fluorinated surfactant with a molecular weight lower than 1000. The fluorinated surfactant (A) is not particularly restricted but preferably is a fluorinated anionic surfactant and preferably has 7 to 10 carbon atoms; more preferably, it is a fluorinated anionic surfactant (Aa) of 7 to 10 carbon atoms. As the fluorinated surfactant (A), there may be mentioned, for example, perfluorooctanoic acid [PFOA], perfluorooctylsulfonic acid [PFOS] and like fluorinated organic acids, or salts thereof. When the fluorinated surfactant (A) is in the form of a salt, the salt-forming counter ion is, for example, an alkali metal ion or $NH_4^+$; the alkali metal ion is, for example, $Na^+$ or $Ka^+$. $NH_4^+$ is preferred as the counter ion, among others.

From the viewpoint of maintaining the fluoropolymer characteristics, the to-be-treated aqueous fluoropolymer dispersion contains a fluorinated surfactant (A) in an amount of preferably 50 ppm or less, more preferably 30 ppm or less, of the fluoropolymer.

The to-be-treated aqueous fluoropolymer dispersion may contain a nonionic surfactant in addition to the above mentioned fluoropolymer, aqueous medium and fluorinated surfactant (A). As the above nonionic surfactant, there may be mentioned, for example, ether type nonionic surfactants such as polyoxyethylene alkylphenyl ethers, polyoxyethylene alkyl ethers, polyoxyethylenealkylene alkyl ethers, polyoxyethylene derivatives such as ethylene oxide/propylene oxide block copolymers, ester type nonionic surfactants such as sorbitan fatty acid esters, polyoxyethylenesorbitan fatty acid esters, polyoxyethylenesorbitol fatty acid esters, glycerol fatty acid esters and polyoxyethylene fatty acid esters, and amine type nonionic emulsifiers such as polyoxyethylenealkylamines and alkylalkanolamides. From the environmental viewpoint, those nonionic surfactants which do not have alkylphenol moiety in their structure are preferably used. The to-be-treated aqueous fluoropolymer dispersion may contain the above nonionic surfactant preferably at an amount of 50 parts by mass or less, more preferably 20 parts by mass or less, per 100 parts by mass of the fluoropolymer.

The to-be-treated aqueous fluoropolymer dispersion can be prepared, for example, by polymerization in an aqueous medium in the presence of a fluorinated surfactant (A). In the process for producing an aqueous fluoropolymer dispersion according to the present invention, the to-be-treated aqueous fluoropolymer dispersion may be prepared by polymerization in the presence of the fluorinated surfactant (A) with a molecular weight lower than 1000 thereby to obtain an aqueous dispersion and removal treatment of the aqueous dispersion for removing the fluorinated surfactant (A) therefrom. The fluoromonomer to be used to the polymerization mentioned above is not particularly restricted but includes, among others, TFE, HFP, PAVEs and vinylidene fluoride [VDF]. The fluoromonomer to be used for the above polymerization may comprise a single species or two or more species. In the polymerization, a non-fluorinated monomer may additionally be used according to need. Such polymerization conditions as temperature and pressure can be properly selected according to the fluoromonomer and surfactant species employed and the amounts thereof, the fluoropolymer species desired and other factors.

The to-be-treated aqueous fluoropolymer dispersion may be obtained by after-treatment after the above polymerization. The after-treatment is not particularly restricted but includes such conventional procedures as concentration and purification; treatment for removing the fluorinated surfactant (A) is preferred. The after-treatment may comprise one run of a conventional procedure, or two or more repetitions of a conventional procedure or a combination of those procedures. As the method of concentration to be carried out as the above after-treatment, there may be mentioned, for example, the cloud point concentration method described in International Publication 2004/050719, the ion exchange resin treatment method described in Japanese Kohyo Publication 2002-532583 and the ultrafiltration method described in Japanese Kokai Publication Sho-55-120630.

The process for producing an aqueous fluoropolymer dispersion according to the present invention comprises adding a specific compound to the to-be-treated aqueous fluoropolymer dispersion. The specific compound generally comprises (1) a sulfosuccinic acid alkyl ester or a salt thereof, or a sulfosuccinic acid fluoroalkyl ester or a salt thereof, (2) the above-mentioned fluorinated surfactant (A), (3) a fluorinated surfactant (B) with a molecular weight lower than 1000 differing from the fluorinated surfactant (A) and/or (4) an aliphatic carboxylic acid or a salt thereof. In the present invention, when the specific compound is in the form of a salt, the salt form can include partly or wholly ionized forms. The process for producing an aqueous fluoropolymer dispersion according to the present invention may comprise adding only one of the compounds (1) to (4) mentioned above or adding two or more of the compounds (1) to (4). Each of the compounds (1) to (4) may comprise one single species or two or more species. In the above-mentioned production process, the specific compound may generally be added in total amount of 10 to 5000 ppm, preferably 10 to 2500 ppm, more preferably 10 to 1000 ppm, of the fluoropolymer and, from the viewpoint of reducing its addition amount, in total amount of 500 ppm or less, preferably 400 ppm or less, more preferably 200 ppm or less, still more preferably 180 ppm or less, most preferably 150 ppm or less, of the fluoropolymer. When it is within the above range, the compound may amount to 20 ppm or more, or 25 ppm or more, or 30 ppm or more, of the fluoropolymer.

The compound (1), the sulfosuccinic acid alkyl ester or the salt thereof, or the sulfosuccinic acid fluoroalkyl ester or the salt thereof, is preferably in the form of a diester, although it may be in the form of a monoester. As the compound (1), there may be mentioned, for example, sulfosuccinic acid alkyl esters or salts thereof represented by the following general formula (I):

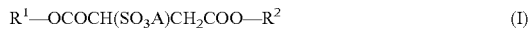

(wherein $R^1$ and $R^2$ are the same or different and each represents an alkyl group of 6 to 10 carbon atoms and A represents an alkali metal, an alkaline earth metal or $NH_4$), and sulfosuccinic acid fluoroalkyl esters or salts thereof represented by the following general formula (II):

(wherein $Rf^1$ and $Rf^2$ are the same or different and each represents a perfluoroalkyl group of 1 to 6 carbon atoms, which optionally have a terminal hydrogen atom, $R^3$ and $R^4$ are the same or different and each represents an alkylene group of 1 to 5 carbon atoms and A represents an alkali metal, an alkaline earth metal or $NH_4^+$).

As $R^1$ and $R^2$ in the above general formula (I), there may be mentioned, for example, such straight or branched alkyl groups as n-hexyl, n-heptyl, n-octyl, n-nonyl, n-decyl and 2-ethylhexyl. In the above general formula (II), $Rf^1$ and $Rf^2$ each preferably has 3 to 5 carbon atoms, and $R^3$ and $R^4$ each preferably has 1 or 2 carbon atoms. Preferred as A in the above general formulas (I) and (II) are, for example, Na and $NH_4^+$. As the sulfosuccinic acid alkyl ester, there may be mentioned, for example, di-n-octyl sulfosuccinate and di-2-ethylhexyl sulfosuccinate.

In the production process according to the present invention, when (1) the sulfosuccinic acid alkyl ester or the salt thereof, or the sulfosuccinic acid fluoroalkyl ester or the salt thereof is added as the specific compound, the addition amount of (1) may be within the range mentioned above referring to the total amount. From the viewpoint of reducing its addition amount, however, the compound (1) is generally added at an amount of 10 to 500 ppm, preferably 10 to 400 ppm, more preferably 10 to 350 ppm, still more preferably 10 to 200 ppm, particularly preferably 170 ppm or less, most preferably 150 ppm or less, of the fluoropolymer. So long as it is within the above range, the compound (1) may be amount to 20 ppm or more, or 25 ppm or more, of the fluoropolymer.

In the production process according to the present invention, when (2) the fluorinated surfactant (A) mentioned above, is added as the specific compound, the compound (2) is preferably added in an amount of 10 to 300 ppm, more preferably 10 to 200 ppm, still more preferably 20 to 170 ppm, particularly preferably 25 to 150 ppm, of the fluoropolymer. From the viewpoint of reducing its addition amount, 10 to 100 ppm of the fluoropolymer is preferred.

The fluorinated surfactant (B) is not particularly restricted but may be any fluorinated surfactant with a molecular weight lower than 1000 differing from the fluorinated surfactant (A). Preferably, it has 4 to 6 carbon atoms, more preferably 4 or 5 carbon atoms. The fluorinated surfactant (B) is preferably a fluorinated anionic surfactant, more preferably a fluorinated anionic surfactant (Ba) of 4 to 6 carbon atoms. Preferred, among others, as the fluorinated anionic surfactant are fluoroalkylcarboxylic acids or salts thereof and fluoroalkylsulfonic acids or salts thereof. More preferred are perfluorocarboxylic acids or salts thereof and perfluoroalkylsulfonic acids or salts thereof. When the fluorinated surfactant (B) is in the form of a salt, the salt-forming counter ion is, for example, an alkali metal ion or $NH_4^+$; as the alkali metal ion, there may be mentioned $Na^+$ and $Ka^+$, among others. Among them, $NH_4^+$ is preferred as the counter ion.

In the production process according to the present invention, when the compound (3), the fluorinated surfactant (B) is added as the specific compound, the compound (3) may be added in an amount within the range mentioned hereinabove referring to the total amount but, from the viewpoint of reducing its addition amount, it is preferably added in an amount of 250 ppm or less, more preferably 200 ppm or less, still more preferably 170 ppm or less, particularly preferably 150 ppm or less, of the fluoropolymer. So long as it is within the above range, the compound (3) may amount to 20 ppm or more, or 25 ppm or more, of the fluoropolymer.

Preferred as the compound (4), namely an aliphatic carboxylic acid or a salt thereof, are, for example, saturated or unsaturated aliphatic carboxylic acids which have 9 to 13 carbon atoms and may have —OH as a substituent for a terminal H, or salts thereof. Preferred as such aliphatic carboxylic acids are monocarboxylic acids, and decanoic acid, undecanoic acid, undecenoic acid, lauric acid and hydroxydodecanoic acid are preferred as the monocarboxylic acids.

In the production process according to the present invention, when the compound (4), namely an aliphatic carboxylic acid or a salt thereof, is added as the specific compound, the compound (4) may be added in an amount within the range mentioned hereinabove referring to the total amount but, from the viewpoint of reducing its addition amount, in an amount of 180 ppm or less of the fluoropolymer. So long as it is within the above range, the compound (4) may amount to 20 ppm or more of the fluoropolymer.

In the production process according to the present invention, a sulfosuccinic acid alkyl ester or a salt thereof, a sulfosuccinic acid fluoroalkyl ester or a salt thereof and/or the fluorinated surfactant (B) is preferably added as the specific compound. More preferably, a sulfosuccinic acid alkyl ester or a salt thereof, or a sulfosuccinic acid fluoroalkyl ester or a salt thereof is added as the specific compound. The fluorinated surfactant (A) may be used as the specific compound for the purpose of decreasing the viscosity of the to-be-treated aqueous fluoropolymer dispersion but, from the viewpoint of reducing the content of the fluorinated surfactant (A), it is preferred that it be not used in excess.

The process for producing an aqueous fluoropolymer dispersion according to the present invention may also comprise a conventional concentration procedure and/or purification procedure after addition of the specific compound to the to-be-treated aqueous fluoropolymer dispersion. The concentration procedure and purification procedure each may comprise only one run of a procedure, or two or more repetitions a procedure or a combination of two or more procedures. The production process according to the present invention may also comprise repetitions of the step of carrying out the concentration procedure and/or purification procedure after addition of the specific compound.

In the process for producing an aqueous fluoropolymer dispersion according to the present invention, the viscosity at 25° C. of the aqueous fluoropolymer dispersion can be adjusted to 0.010 to 0.16 Pa·s, and the viscosity at 35° C. thereof to 0.010 to 0.10 Pa·s, by the addition of the specific compound. Therefore, the process for producing an aqueous fluoropolymer dispersion according to the present invention can be applied also as a viscosity reducing method. The production process according to the present invention can adjust the viscosity at 25° C. preferably to 0.075 Pa·s or lower, more preferably 0.050 Pa·s or lower and that viscosity at 35° C. preferably to 0.075 Pa·s or lower, more preferably 0.05 Pa·s or lower. The viscosity, so referred to herein, is measured at a measurement temperature of 25° C. or 35° C. using a type B viscometer (product of Tokyo Keiki, rotor No. 2) at a rotation speed of 60 rpm.

The aqueous fluoropolymer dispersion of the present invention is an aqueous dispersion in which a particles of fluoropolymer is dispersed in an aqueous medium. The aqueous fluoropolymer dispersion contains the fluorinated anionic surfactant (Aa) of 7 to 10 carbon atoms in an amount of 100 ppm or less of the fluoropolymer. The aqueous fluoropolymer dispersion further contains a sulfosuccinic acid alkyl ester or a salt thereof, a sulfosuccinic acid fluoroalkyl ester or a salt thereof and/or the fluorinated anionic surfactant (Ba) each in an amount within the respective specific range to be given later herein.

The aqueous fluoropolymer dispersion of the present invention generally comprises a particles of fluoropolymer dispersed in an aqueous medium. The particles of fluoropolymer and aqueous medium in the aqueous fluoropolymer dispersion are respectively the same as those described hereinabove referring to the to-be-treated aqueous fluoropolymer dispersion. In the aqueous fluoropolymer dispersion, the particles of fluoropolymer account for 30 to 70% by mass of the aqueous fluoropolymer dispersion. A preferred lower limit of the fluoropolymer concentration is 35% by mass, and a preferred upper limit thereof is 65% by mass. The average primary particle diameter of the particles of fluoropolymer is generally 50 to 500 nm, preferably 100 to 350 nm. The average primary particle diameter mentioned above is determined in the following manner. A working curve is constructed which shows the relation between the transmittance of incident light rays having a wavelength of 550 nm per unit length of an aqueous dispersion adjusted to a fluoropolymer concentration of 0.22% by mass and the average primary particle diameter determined by particle diameter measurements in a certain specific direction on a transmission electron photomicrograph, and the average primary particle diameter of a sample is determined, using the working curve, from the transmittance as measured in the above manner.

The fluorinated anionic surfactant (Aa) preferably has a molecular weight lower than 1000. The fluorinated anionic surfactant (Aa) is more preferably a fluorinated organic acid such as PFOA or PFOS, or a salt thereof. In the aqueous fluoropolymer dispersion of the present invention, the content of the fluorinated anionic surfactant (Aa) preferably amounts to 100 ppm or less of the fluoropolymer, more preferably 50 ppm or less, still more preferably 30 ppm or less, even more preferably 10 ppm or less.

The aqueous fluoropolymer dispersion of the present invention contains a sulfosuccinic acid alkyl ester or a salt thereof, a sulfosuccinic acid fluoroalkyl ester or a salt thereof and/or the fluorinated anionic surfactant (Ba) generally in total amount of 10 to 5000 ppm, preferably 10 to 2500 ppm, more preferably 10 to 1000 ppm, of the fluoropolymer and, from the viewpoint of reducing its addition amount, in total amount of 10 to 500 ppm, preferably 10 to 400 ppm, more preferably 10 to 200 ppm, still more preferably 180 ppm or less, most preferably 150 ppm or less of the fluoropolymer. So long as it is within the above range, the total content may amount to 20 ppm or more of the fluoropolymer, 25 ppm or more of the fluoropolymer, or 30 ppm or more of the fluoropolymer.

The sulfosuccinic acid alkyl ester, sulfosuccinic acid fluoroalkyl ester or salts thereof in the aqueous fluoropolymer dispersion of the present invention is the same as that to be used as the specific compound (1) mentioned above. The fluorinated anionic surfactant (Ba) is a fluorinated surfactant differing from the fluorinated surfactant (Aa) and preferably has a molecular weight lower than 1000. As the fluorinated anionic surfactant, there may be mentioned the same ones as those mentioned hereinabove referring to the specific compound (3).

The aqueous fluoropolymer dispersion of the present invention can be prepared, for example, by carrying out the production process of the present invention as described hereinabove. The aqueous fluoropolymer dispersion of the present invention can preferably have a viscosity at 25° C. of 0.16 Pa·s or lower, more preferably 0.075 Pa·s or lower and can preferably have a viscosity at 35° C. of 0.10 Pa·s or lower, more preferably 0.075 Pa·s or lower. In spite of the fact that the content of the fluorinated anionic surfactant (Aa) is very low, the viscosities at the respective temperatures of the above-mentioned aqueous fluoropolymer dispersion can fall within the above-specified ranges and, therefore, the dispersion is excellent in workability. Even when the fluoropolymer concentration is high, the above aqueous fluoropolymer dispersion can have such viscosities as fall within the above ranges.

The aqueous fluoropolymer dispersion of the present invention, which contains the fluorinated anionic surfactant (Aa) at a very low level, does not cause discoloration even upon processing into films, coating films and so forth. Furthermore, the aqueous fluoropolymer dispersion, which contains the specified compound mentioned above, is excellent in temperature stability, storage stability, mechanical stability, applicability in thick coating and penetration in impregnation, among others and, even when the content of the specific compound is low, it is excellent in mechanical stability, in particular in low rate shear rubbing stability.

EFFECTS OF THE INVENTION

The process for producing an aqueous fluoropolymer dispersion according to the present invention, which has the constitution described hereinabove, can prepare an aqueous fluoropolymer dispersion low in viscosity and excellent in workability in spite of the fact that the content of the fluorinated surfactant (A) is very low and, even when the fluoropolymer concentration is high, the process can provide a dispersion with low levels of viscosity. The aqueous fluoropolymer dispersion of the present invention, which has the constitution described hereinabove, is low in viscosity and therefore excellent in workability in spite of the fact that the content of the fluorinated anionic surfactant (Aa) is very low and, even when the fluoropolymer concentration is high, it can have a low viscosity.

BEST MODES FOR CARRYING OUT THE INVENTION

The following examples and comparative examples illustrate the present invention in further detail. These examples and comparative examples are, however, by no means limitative of the present invention. In the examples and comparative examples, "part (s)" means "part (s) by mass", unless otherwise specified. The measurements made in each example and each comparative example were carried out according to the methods described below.

1. Fluoropolymer Concentration (P)

About 1 g (X) of each sample was weighed in an aluminum cup with a diameter of 5 cm. The sample was dried at 100° C. for 1 hour and then further dried at 300° C. for 1 hour to give a heating residue (Z) and a calculation was made as follows: P=Z/X×100(%).

2. Ammonium Perfluorooctanoate [PFOA] Concentration

After addition of an equal volume of methanol to each aqueous dispersion obtained, the mixture was subjected to Soxhlet extraction and the extract was subjected to high-performance liquid chromatography [HPLC] under the conditions given below. In calculating the fluorinated surfactant concentration, use was made of a working curve constructed based on the data obtained by carrying out HPLC measurements under the same conditions using the extracts prepared in the same manner from aqueous dispersions each having a known fluorinated surfactant concentration.
(Measurement Conditions)
Column: ODS-120T (4.6 ø×250 mm, product of Tosoh Corp.)
Developing solution: acetonitrile/0.6% (by mass) aqueous perchloric acid=1/1 (vol/vol %)
Sample size: 20 μL
Flow rate: 1.0 ml/minute
Detection wavelength: UV 210 nm
Column temperature: 40° C.

3. Nonionic Surfactant Content (N) in Aqueous Dispersion

About 1 g (X g) of each sample was weighed in an aluminum cup with a diameter of 5 cm, the sample was heated at 100° C. for 1 hour to give a heating residue (Y g), the heating residue (Y g) was further heated at 300° C. for 1 hour to give a heating residue (Z g) and a calculation was made according to the equation: N=[(Y−Z)/Z]×100(%).

4. Viscosity at 25° C.

A 100-ml portion of each aqueous dispersion was subjected to measurement using a type B viscometer (product of Tokyo Keiki, rotor No. 2) at a measurement temperature of 25° C. and at a rotation speed of 60 rpm.

5. Viscosity at 35° C.

Measurements were made in the same manner as mentioned above under 4 except that the measurement temperature was changed to 35° C.

6. Mechanical Stability

A 5-cm-square glass cloth (180 micrometers in thickness) and 50 cc of each aqueous fluoropolymer dispersion were placed in an automatic mortar and, after 5 minutes of crushing, the resulting mass was filtered through a 400-mesh filter. The aggregate on the mesh was dried at 300° C. for 1 hour, the amount of the fluoropolymer aggregated was measured, and the mechanical stability was evaluated according to the criteria given below using the value (amount of fluoropolymer aggregated/amount of polymer in aqueous fluoropolymer dispersion before measurement) as an index.
(Evaluation Criteria)
◎: The above index value is lower than 1.0.
O: The above index value is not lower than 1.0 and not higher than 2.0
X: The above index value is higher than 2.0.

7. Penetration

A poly(methyl methacrylate) [PMMA]-made cylinder having an inside diameter of 30 mm and graduated at 1-ml intervals was fixed to a 180-μm-thick glass cloth (electric insulation cloth; WE18K105, product of Nitto Boseki Co., Ltd.) to form an angle of 90° with an adhesive double coated tape, and the whole, in that state, was fixed onto a Petri dish to make the glass cloth flat and even. A 50-ml portion of each measurement sample was placed in the PMMA cylinder and, with that point of time being regarded as the starting point, the time required for the measurement sample to begin to drop after permeation through the glass cloth was measured. Five measurements were carried with the same sample, and the penetrating ability was evaluated based on the mean value of the measured time periods as ◎, O or X according to the time range within which the mean value fell, as follows:
◎: not longer than 15 minutes;
O: not longer than 30 minutes;
X: longer than 30 minutes.

COMPARATIVE EXAMPLE 1

A PTFE dispersion (aqueous fluoropolymer dispersion) containing 55% of polytetrafluoroethylene [PTFE], PFOA in an amount of 5 ppm of PTFE and a nonionic surfactant (Triton X-100, product of Dow Chemical) in an amount of 9 parts per 100 parts of PTFE was prepared. The aqueous fluoropolymer dispersion obtained had a viscosity at 25° C. of 0.283 Pa·s and a viscosity at 35° C. of 0.345 Pa·s.

EXAMPLE 1

A PTFE dispersion containing 55% of PTFE, PFOA in an amount of 5 ppm of PTFE and a nonionic surfactant (Triton X-100, product of Dow Chemical) in an amount of 9 parts per 100 parts of PTFE was used as the to-be-treated aqueous fluoropolymer dispersion. To this was added $C_8H_{17}OCOCH(SO_3Na)CH_2COOC_8H_{17}$ in an amount of 103 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.02 Pa·s and a viscosity at 35° C. of 0.046 Pa·s.

EXAMPLE 2

To the to-be-treated aqueous fluoropolymer dispersion of Example 1 was added $C_8H_{17}OCOCH(SO_3Na)CH_2COOC_8H_{17}$ in an amount of 52 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.05 Pa·s.

EXAMPLE 3

To the to-be-treated aqueous fluoropolymer dispersion of Example 1 was added $C_8H_{17}OCOCH(SO_3Na)CH_2COOC_8H_{17}$ in an amount of 32 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.153 Pa·s.

EXAMPLE 4

To the to-be-treated aqueous fluoropolymer dispersion of Example 1 was added $F(CF_2CF_2)_2C_2H_4OCOCH(SO_3Na)$ $CH_2COOC_2H_4(CF_2CF_2)_2F$ in an amount of 67 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.025 Pa·s and a viscosity at 35° C. of 0.09 Pa·s.

EXAMPLE 5

To the to-be-treated aqueous fluoropolymer dispersion of Example 1 was added F $(CF_2CF_2)_2C_2H_4OCOCH(SO_3Na)$ $CH_2COOC_2H_4(CF_2CF_2)_2F$ in an amount of 34 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.146 Pa·s.

EXAMPLE 6

To the to-be-treated aqueous fluoropolymer dispersion of Example 1 was added $C_4F_9COONH_4$ in an amount of 100 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.08 Pa·s.

EXAMPLE 7

To the to-be-treated aqueous fluoropolymer dispersion of Example 1 was added PFOA in an amount of 20 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.045 Pa·s.

EXAMPLE 8

To the to-be-treated aqueous fluoropolymer dispersion of Example 1 was added PFOA in an amount of 40 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.014 Pa·s.

EXAMPLE 9

To the to-be-treated aqueous fluoropolymer dispersion of Example 1 was added $CH_3(CH_2)_8COOH$ in an amount of 34 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.0285 Pa·s and a viscosity at 35° C. of 0.0627 Pa·s.

COMPARATIVE EXAMPLE 2

To the to-be-treated aqueous fluoropolymer dispersion of Example 1 was added sodium dodecyl sulfate [SDS] in an amount of 100 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.172 Pa·s.

COMPARATIVE EXAMPLE 3

To the to-be-treated aqueous fluoropolymer dispersion of Example 1 was added SDS in an amount of 65 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.235 Pa·s.

COMPARATIVE EXAMPLE 4

To the to-be-treated aqueous fluoropolymer dispersion of Example 1 was added SDS in an amount of 25 ppm of PTFE; thus was prepared an aqueous PTFE dispersion having a PTFE concentration of 55% and containing Triton X-100 in an amount of 9 parts per 100 parts of PTFE. The aqueous PTFE dispersion obtained had a viscosity at 25° C. of 0.28 Pa·s.

COMPARATIVE EXAMPLE 5

A PTFE dispersion containing 60% of PTFE, PFOA in an amount of 5 ppm of PTFE and a nonionic surfactant (TDS80, product of Daiichi Kogyo Seiyaku Co., Ltd.) in an amount of 6 parts per 100 parts of PTFE was prepared. The aqueous PTFE dispersion obtained had a viscosity at 25° C. of 0.35 Pa·s.

EXAMPLE 10

A PTFE dispersion containing 60% of PTFE, PFOA in an amount of 5 ppm of PTFE and a nonionic surfactant (TDS80, product of Daiichi Kogyo Seiyaku) in an amount of 6 parts per 100 parts of PTFE was used as the to-be-treated aqueous fluoropolymer dispersion. To this was added $C_8H_{17}OCOCH$ $(SO_3Na)CH_2COOC_8H_{17}$ in an amount of 100 ppm of PTFE; thus was prepared an aqueous PTFE dispersion having a PTFE concentration of 60% and containing TDS80 in an amount of 6 parts per 100 parts of PTFE. The aqueous PTFE dispersion obtained had a viscosity at 25° C. of 0.12 Pa·s.

EXAMPLE 11

A PTFE dispersion containing 60% of PTFE, PFOA in an amount of 5 ppm of PTFE and a nonionic surfactant (TDS80, product of Daiichi Kogyo Seiyaku) in an amount of 6 parts per 100 parts of PTFE was used as the to-be-treated aqueous fluoropolymer dispersion. To this was added $C_8H_{17}OCOCH$ $(SO_3Na)CH_2COOC_8H_{17}$ in an amount of 300 ppm of PTFE; thus was prepared an aqueous PTFE dispersion having a PTFE concentration of 60% and containing TDS80 in an amount of 6 parts per 100 parts of PTFE. The aqueous PTFE dispersion obtained had a viscosity at 25° C. of 0.022 Pa·s.

EXAMPLE 12

A PTFE dispersion containing 60% of PTFE, PFOA in an amount of 5 ppm of PTFE and a nonionic surfactant (TDS80, product of Daiichi Kogyo Seiyaku) in an amount of 6 parts per 100 parts of PTFE was used as the to-be-treated aqueous fluoropolymer dispersion. To this was added PFOA in an amount of 30 ppm of PTFE; thus was prepared an aqueous PTFE dispersion having a PTFE concentration of 60% and containing PFOA in an amount of 35 ppm of PTFE. The aqueous PTFE dispersion obtained had a viscosity at 25° C. of 0.02 Pa·s.

EXAMPLE 13

A PTFE dispersion containing 60% of PTFE, PFOA in an amount of 5 ppm of PTFE and a nonionic surfactant (Genapol X80, product of Daiichi Kogyo Seiyaku) in an amount of 6 parts per 100 parts of PTFE was used as the to-be-treated aqueous fluoropolymer dispersion. To this was added PFOA in an amount of 35 ppm of PTFE; thus was prepared an aqueous PTFE dispersion having a PTFE concentration of 60% and containing PFOA in an amount of 40 ppm of PTFE. The aqueous PTFE dispersion obtained had a viscosity at 25° C. of 0.018 Pa·s. In each of the Examples and Comparative Examples, the mechanical stability and penetrating ability of the suspension obtained were measured by the methods mentioned above. The test results thus obtained are shown in Table 1.

TABLE 1

| | PC(%) | Amount of PFOA (ppm/Polym)(note 1) | Amount of non-ionic surfactant | (%/Polym)(note 1) | Specific compound addition level | (ppm/Polym)(note 1) | Viscosity(Pa·S) 25° C. | 35° C. | Penetration | Mechanical stability(%) |
|---|---|---|---|---|---|---|---|---|---|---|
| Example 1 | 55 | 5 | TritonX100 | 9 | OTP | 103 | 0.02 | 0.046 | ⊚ | ⊚ | 0.4 |
| Example 2 | 55 | 5 | TritonX100 | 9 | OTP | 52 | 0.05 | — | ⊚ | ⊚ | 0.9 |
| Example 3 | 55 | 5 | TritonX100 | 9 | OTP | 32 | 0.153 | — | ○ | ○ | 1.8 |
| Example 4 | 55 | 5 | TritonX100 | 9 | NS | 67 | 0.025 | 0.09 | ⊚ | ⊚ | 0.5 |
| Example 5 | 55 | 5 | TritonX100 | 9 | NS | 34 | 0.146 | — | ○ | ○ | 1.7 |
| Example 6 | 55 | 5 | TritonX100 | 9 | $C_4F_9COONH_4$ | 100 | 0.08 | — | ⊚ | ○ | 1 |
| Example 7 | 55 | 5 | TritonX100 | 9 | PFOA | 20 | 0.045 | — | ⊚ | ○ | 1 |
| Example 8 | 55 | 5 | TritonX100 | 9 | PFOA | 40 | 0.014 | — | ⊚ | ⊚ | 0.6 |
| Example 9 | 55 | 5 | TritonX100 | 9 | $CH_3(CH_2)_8COOH$ | 34 | 0.0285 | 0.0627 | ⊚ | ⊚ | 0.8 |
| Example 10 | 60 | 5 | TDS80 | 6 | OTP | 100 | 0.12 | — | ○ | ○ | 1.4 |
| Example 11 | 60 | 5 | TDS80 | 6 | OTP | 300 | 0.022 | — | ⊚ | ⊚ | 0.4 |
| Example 12 | 60 | 5 | TDS80 | 6 | PFOA | 30 | 0.02 | — | ⊚ | ⊚ | 0.9 |
| Example 13 | 60 | 5 | GenapolX80 | 6 | PFOA | 35 | 0.018 | — | ⊚ | ⊚ | 0.8 |
| Comparative Example 1 | 55 | 5 | TritonX100 | 9 | — | 0 | 0.283 | 0.345 | x | x | 10 |
| Comparative Example 2 | 55 | 5 | TritonX100 | 9 | SDS | 100 | 0.172 | — | ○ | x | 5 |
| Comparative Example 3 | 55 | 5 | TritonX100 | 9 | SDS | 65 | 0.235 | — | x | x | 6 |
| Comparative Example 4 | 55 | 5 | TritonX100 | 9 | SDS | 25 | 0.28 | — | x | x | 7 |
| Comparative Example 5 | 60 | 5 | TDS80 | 6 | — | 0 | 0.35 | — | x | x | 10 |

(note 1)Each amount is shown in terms of amount per fluoropolymer.
(note 2)PC:Fluoropolymer (PTFE) concentration
OTP: $C_8H_{17}OCOCH(SO_3Na)CH_2COOC_8H_{17}$
NS: $F(CF_2CF_2)_2C_2H_4OCOCH(SO_3Na)CH_2COOC_2H_4(CF_2CF_2)_2F$
SDS: Dodecyl sodium sulfate From the results of each Example, it was revealed that the viscosities at 25° C. and 35° C. each can be reduced at least to an amount not exceeding about 0.16 Pa·s by adding the specific compound. On the contrary, it was revealed that, in Comparative Examples 1 to 3 in which the surfactant was not the specific compound, only those aqueous dispersions which had a viscosity of 0.17 Pa·s or higher could be obtained. As for the proportion of the fluoropolymer aggregate, the proportion in the aqueous fluoropolymer dispersion obtained in each Example was not higher than 1% whereas the proportion in the aqueous dispersion obtained in each Comparative Example was 5% or higher. Penetrating abilities were compared; good penetration could be confirmed in all the Examples whereas the penetrating ability was poor in the Comparative Examples except for Comparative Example 2.

INDUSTRIAL APPLICABILITY

The process for producing an aqueous fluoropolymer dispersion according to the present invention, which has the constitution described hereinabove, can prepare an aqueous fluoropolymer dispersion low in viscosity and excellent in workability in spite of the fact that the content of the fluorinated surfactant (A) is very low and, even when the fluoropolymer concentration is high, the process can provide a dispersion with low levels of viscosity. The aqueous fluoropolymer dispersion of the present invention, which has the constitution described hereinabove, is low in viscosity and therefore excellent in workability in spite of the fact that the content of the fluorinated surfactant (A) is very low and, even when the fluoropolymer concentration is high, it can have a low viscosity.

The invention claimed is:

1. A process for producing an aqueous fluoropolymer dispersion which comprises adding a specific compound to a to-be-treated aqueous fluoropolymer dispersion containing a particle of fluoropolymer dispersed therein,
   said to-be-treated aqueous fluoropolymer dispersion containing a fluorinated surfactant (A) with a molecular weight lower than 1000 in an amount of 100 ppm or less of said fluoropolymer, and
   said specific compound being (3) a fluorinated surfactant (B) with a molecular weight lower than 1000 differing from said fluorinated surfactant (A) and/or (4) an aliphatic carboxylic acid or a salt thereof, which compound is added in total amount of 10 to 5000 ppm of said fluoropolymer,
   wherein the aliphatic carboxylic acid or a salt thereof is a saturated or unsaturated aliphatic carboxylic acid having 9 to 13 carbon atoms and optionally having —OH as a substituent for a terminal H, or a salt thereof.

2. The process for producing an aqueous fluoropolymer dispersion according to claim 1, wherein the specific compound is added in total amount of 10 to 2500 ppm of the fluoropolymer.

3. The process for producing an aqueous fluoropolymer dispersion according to claim 1, wherein the specific compound is added in total amount of 10 to 500 ppm of the fluoropolymer.

4. The process for producing an aqueous fluoropolymer dispersion according to claim 1, wherein the fluorinated surfactant (A) is a fluorinated anionic surfactant (Aa) of 7 to 10 carbon atoms.

5. The process for producing an aqueous fluoropolymer dispersion according to claim 1, wherein the fluorinated surfactant (B) is a fluorinated anionic surfactant (Ba) of 4 to 6 carbon atoms.

6. The process for producing an aqueous fluoropolymer dispersion according to claim 1, wherein the specific compound is the fluorinated surfactant (B).

7. The process for producing an aqueous fluoropolymer dispersion according to claim 1,
wherein the to-be-treated aqueous fluoropolymer dispersion is prepared by polymerization in the presence of the fluorinated surfactant (A) with a molecular weight lower than 1000 thereby to obtain an aqueous dispersion and removal treatment of said aqueous dispersion for removing said fluorinated surfactant (A) therefrom.

* * * * *